Figure 1:
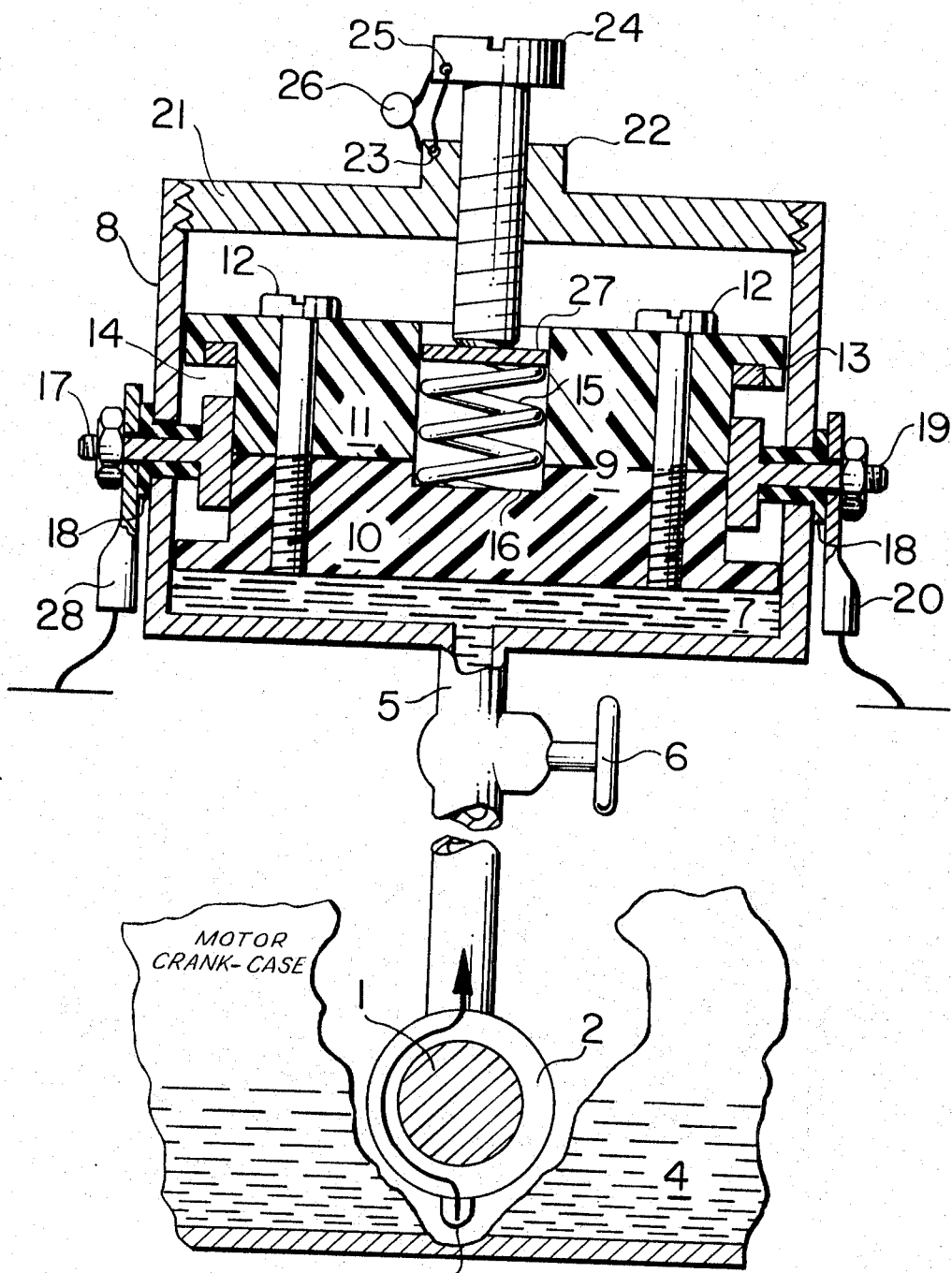

Jan. 16, 1968  J. D. LANGDON  3,363,715
MOTOR VEHICLE GROUND SPEED CONTROL
Filed Aug. 6, 1964  3 Sheets-Sheet 1

INVENTOR.
J. D. LANGDON

Jan. 16, 1968 J. D. LANGDON 3,363,715
MOTOR VEHICLE GROUND SPEED CONTROL
Filed Aug. 6, 1964 3 Sheets-Sheet 2

INVENTOR.

J. D. LANGDON

United States Patent Office 3,363,715
Patented Jan. 16, 1968

3,363,715
MOTOR VEHICLE GROUND SPEED CONTROL
Jesse D. Langdon, East Rockaway, N.Y. (R.F.D. Box 250, Lafayetteville, Red Hook, N.Y. 12571)
Filed Aug. 6, 1964, Ser. No. 387,860
4 Claims. (Cl. 180—108)

This invention relates to devices for controlling and limiting the ground speed of an automotive vehicle and teaches a new and novel arrangement of the component elements of an automotive vehicle combined with adjustable switch means in a manner to permit the motor of the vehicle to attain maximum speed up to the moment that the ground speed of the vehicle has reached a predetermined limit, according to the adjustment of the switch means. One preferred form of the invention consists of:

A ground speed control for automotive vehicle means including a motor, normally operative electrical circuit means normally closed by switch means for controlling said motor, pump means concomitant rotating drive shaft means contiguous between said motor and ground contacting wheel means provided for the vehicle means, said switch means including electricity conducting means formed concomitant movable member means disposed within the confines of casing means, the switch member forming a portion of walls enclosing fluid pressure chamber means, respective intake and outlet means provided for said pump means, the intake means leading from a source of fluid pressure supply provided for said pump means, the pump outlet means communicating with the pressure chamber means, said pump means being activated by and in unison with the rotation of the wheel and drive shaft means, the movable switch member means arranged to be disconnected from the electric circuit means under the effect of fluid pressure and being normally held in closed position by adjustable resilient means tensioned against and normally holding said movable member means in closed position until fluid pressure is effective to open the switch means and deactivate the electrical circuit according to the adjusted tension of the resilient means against the switch member.

The presently preferred form of reduction to practice shown by the drawing is used for the purpose of illustration only, it being specifically understood that the construction of the invention can be changed within the scope of the claims.

FIG. 1 of the drawing is an elevation of a hydraulically actuated electric switch showing active elements of construction in median section interconnected with a fragmentary portion of an internal combustion motor crankcase. Adjustment screw 24, spring 15 and assembly screws 12—12 are shown in relief.

Figure 2:
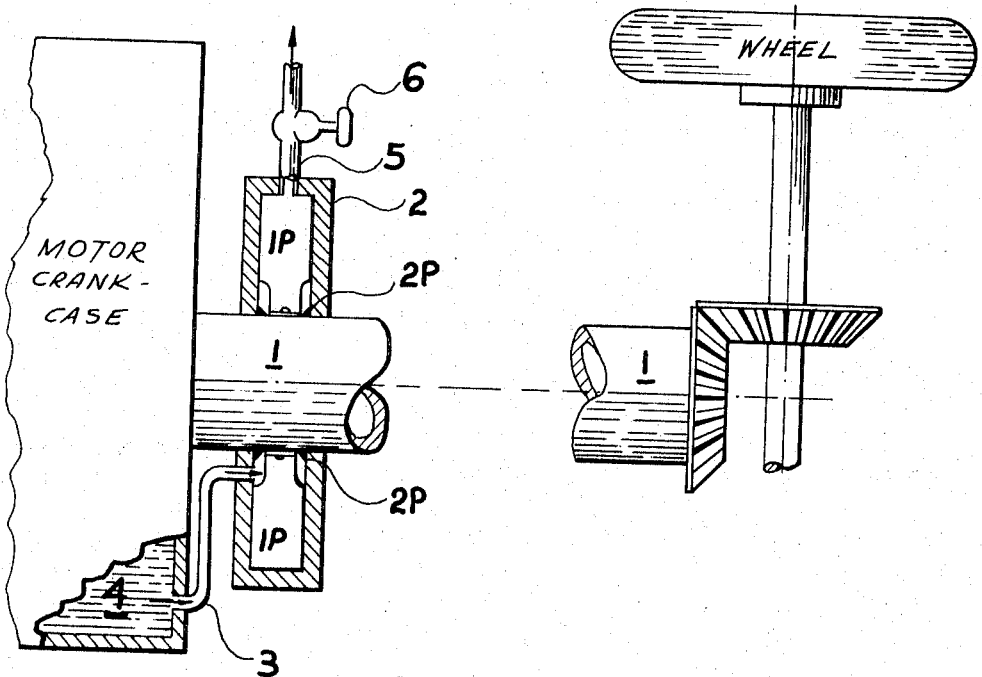

FIG. 2 is a lateral elevation showing in detail the lower portion of FIG. 1 broken away above valve 6, with the drive shaft 1 extended from the crank shaft of an internal combustion motor, the drive shaft 1 being extended thru the casing of a centrifugal pump 2 shown in median section with vanes 1P in relief, integral with shaft 1, shown broken away from a portion terminating in a beveled pinion meshed with a ring gear secured to an axle attached to the drive wheel of an automotive vehicle viewed from above.

Figure 3:
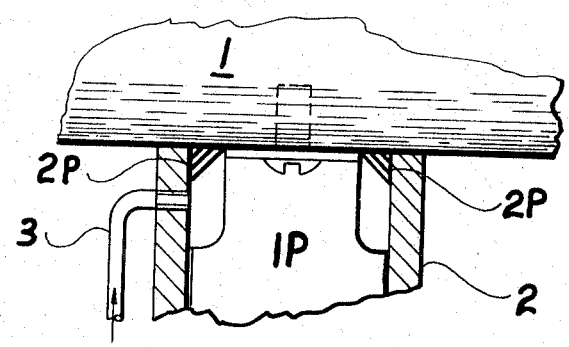

FIG. 3 is a detail of a fragment of shaft 1 attached integral with vane means 1P by means of a screw, a fragment of the casing of pump 2 shown in median section with packing rings 2P surrounding shaft 1 sealing against leakage between shaft 1 and casing of pump 2.

The actual details of construction and arrangement of elements shown by FIGS. 2 and 3 constitute no elements of the invention other than illustrated claimed or described herein to elucidate FIG. 1.

Figure 4:
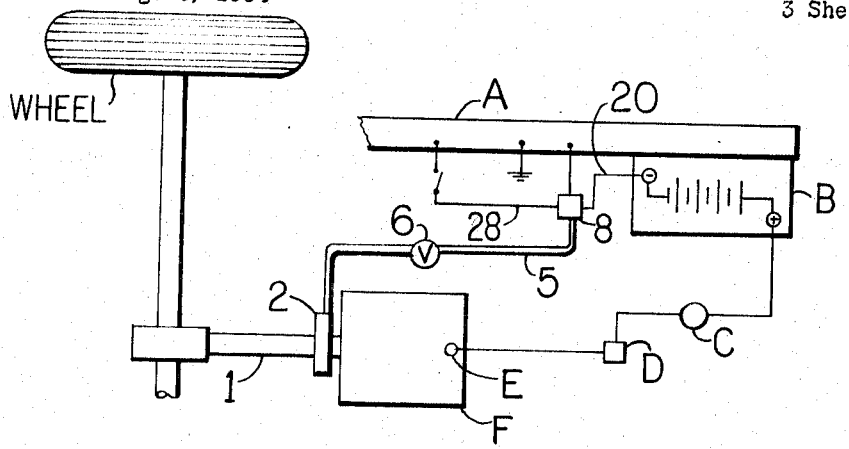

FIG. 4 is a diagrammatic plan showing a complete electrical ignition circuit for an internal combustion engine including the relative position of the pressure operated switch 8 with respect to the various elements of the electrical circuit and pump 2 combined with shaft 1 directly actuated by drive wheels resting on the ground.

Figure 5:
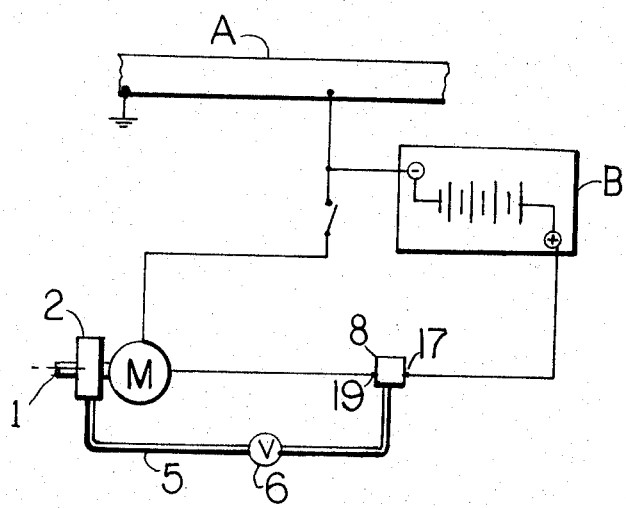

FIG. 5 is a diagram showing a complete electrical circuit for an electric motor provided for an automotive vehicle, together with associated elements essential to a concise description of the invention.

The construction and operation of the invention is best illustrated by FIG. 1 of the drawing: further illustrated by FIGS. 2, 3, 4 and 5 for the purpose of elucidating the specification.

Any unclaimed matter shown by the figures of the drawing is used for the purpose of illustration only. Obviously the relative position of the combination of elements claimed can be rearranged as a matter of choice according to the necessities of mechanical expediency.

Identical numerals indicate identical elements thru out the figures of the drawing. Letter characters designate unclaimed elements of structure considered essential only to a concise descripition of the invention.

The various elements designated by the drawing, essential to the use and operation of the invention, are as follows:

(1) Motor drive shaft protruding from one end of the crank case for connection to the drive wheels of a motor vehicle.

(2) Centrifugal pump mounted surrounding and integral with drive shaft 1.

(3) Pump inlet conduit to pump 2 communicating with motor crank case containing oil.

(4) Pressure fluid in the shape of lubricating oil forming pressure fluid supply means.

(5) Pump outlet and pressure fluid conduit to switch chamber 8.

(6) Pressure fluid control valve for conduit 5.

(7) Pressure fluid chamber.

(8) Pressure operated electric switch.

(9) Piston forming movable wall of pressure fluid chamber.

(10) Pressure chamber segment of piston 9.

(11) Electric ring segment of piston.

(12) Piston assembly screws for segments 10–11.

(13) Electric current transmitting ring recessed into one face of flange means provided for piston segment 10 cofacing the flange means of segment 11.

(14) Annular groove formed between respective cofacing walls of flanges extended radially outward of piston segments 10–11, and reciprocating within the casing wall of switch 88.

(15) Resilient means formed by spring means supported within an axial recess in segment 10, segment 11 being axially perforated to admit resilient means 15.

Electric terminals 17–19 are provided with flanged bases or heads with stems extended thru casing 8 and surrounded by insulating sleeves 18, connectors 20–28 securing respective terminal ends of an interrupted electric circuit provided for any type of electrically actuated motor provided for an automotive vehicle.

Casing 8, shows cap 21 threadedly inserted thereinto and provided with a boss 22 having an adjusting screw 24 disposed therethru and impinging a friction disk 27 resting against resilient means 15, the head of screw 24 has perforations 25 to admit wire 23 extended thru boss 22 and provided with sealing means 26 securing converging ends of wire 23 together locking screw 24 in adjusted position. FIG. 1 of the drawing shows drive shaft means 1 arranged concomitant fluid pressure generating means in the form of centrifugal pump means 2 provided with inlet means 3 for liquid supply means 4 shown contained in a fragmentary portion labeled Motor Crankcase. Outlet conduit 5 provides fluid pressure transmitting means concomitant valve means 6 providing fluid flow control means, arranged concomitant the fluid pressure generating means formed by pump means 2 communicating with the Motor Crank-case containing fluid, in the instant case formed by lubricating oil contained in the Motor Crank-case, and fluid pressure chamber means 9 located above the bottom of cylinder 8 and below piston 9 made of suitable non conducting material, same being formed by lower portion 10 and upper portion 11 secured together by belt means 12—12.

FIG. 2 particularly illustrates the manner in which fluid under pressure is circulated using the type of centrifugal pump recommended.

FIG. 3 shows clearance spaces between the casing wall of pump 2 and the base of blades 1P—1P such as is often provided to limit the amount of pressure built up within the casing of a centrifugal pump, recommended for use with this invention to take the place of valve controlled bypass means such as would be necessary to reduce pressure if a piston or gear pump were used with this invention.

FIG. 4 shows an automobile frame A, and a battery B having one pole grounded to frame A via pressure operated switch 8 interrupting the electrical circuit from the grounded pole of battery B, the low tension portion of the electric circuit being extended from the ungrounded pole of battery B thence to high tension coil C, thence to timed spark breaker D, thence to spark plug E grounded thru internal combustion motor block F, completing the electric circuit, the usual ignition switch may interrupt the low tension portion of the circuit between switch 8 and frame A. Fluid pressure conduit 5 interrupted by valve 6 is extended from pump 2 to pressure operated switch 8, connected in the manner shown by FIG. 1 operating as described.

FIG. 5 shows battery B with one pole grounded to frame A, pressure operated switch 8 interrupting the electric circuit between the ungrounded pole of battery B and electric motor M the ground wire therefrom leading to the grounded pole of battery B. This electric type of circuit is usually interrupted by a reostat and/or suitable starting switch. The pump 2 being mounted integral with drive shaft 1 as shown by FIG. 1 and interconnected with pressure operated switch by conduit 5 in the same manner. It is obvious that a source of pressure fluid includes gas or liquid and may be derived from either atmosphere or a liquid container suitably arranged in a manner depicted by FIG. 1. The operation of the invention being substantially the same as described for FIG. 1.

To install and operate the invention pressure operated switch 8 is cut into the electrical circuit provided for the motor of an automotive vehicle, one end of the cut circuit attached to terminal 17 by connector 28 the opposite end of the circuit being attached to terminal 19 by connector 20.

Electric ring 13 normally rests upon the bases of terminals 17–19 protruding into groove 14 bordered by opposed faces and thereby closing the circuit.

The pump 2 is rotated in unison with shaft 1 geared to a vehicle wheel contacting the ground and building up pressure transmitted by conduit 5 thru control valve 6 into chamber 7 effective to move piston 9 in a manner to disconnect electric conducting ring 13, from respective bases of terminals 17–19 thereby opening the electric circuit and deactivating the motor of the vehicle.

When the ground speed of the vehicle wheels subsides pressure in chamber 7 is reduced accordingly permitting electric ring 13 to again rest upon the respective bases of terminals 17–19 closing the circuit and reactivating the motor.

Having illustrated and described the invention and the operation thereof the following claims are made:

1. A ground speed control for automotive vehicle means including a motor, normally operative electrical circuit means normally closed by switch means for controlling said motor, pump means concomitant rotating drive shaft means contiguous between said motor and ground contacting wheel means provided for the vehicle means, said switch means including electricity conducting means formed concomitant movable member means disposed within the confines of casing means, the switch member forming a portion of walls enclosing fluid pressure chamber means, respective intake and outlet means provided for said pump means, the intake means leading from a source of fluid pressure supply provided for said pump means, the pump outlet means communicating with the pressure chamber means, said pump means being activated by and in unison with the rotation of the wheel and drive shaft means, the movable switch member means arranged to be disconnected from the electric circuit means under the effect of fluid pressure and being normally held in closed position by adjustable resilient means tensioned against and normally holding said movable member means in closed position until fluid pressure is effective to open the switch means and deactivate the electrical circuit according to the adjusted tension of the resilient means against the switch member.

2. A device of the character described, in combination with an electrically activated motor of an automotive vehicle including drive shaft means actively interconnected with the motor of and extended to drive wheel means provided for said automotive vehicle and resting on the ground, pump means actively attached concomitant said drive shaft and drive wheel means, electric circuit means normally closed by electrical switch means comprising a switch member movably disposed within casing means, the movable switch member forming a wall portion of pressure chamber means formed within the confines of said casing means, said pump means communicating with said pressure chamber means and provided with intake means communicating with a fluid pressure supply source, said movable switch means being held in active closed position by adjustable resilient means impinging that side of said movable switch member that is opposite said pressure chamber means, whereby fluid pressure induced into said pressure chamber means by said pump means, is effective against said movable switch member to open the circuit means and deactivate the motor according to adjusted tension of the resilient means against the switch member.

3. A combination of the character described including means for controlling and limiting the ground speed of an automotive vehicle, comprising drive shaft means contiguous between motor means and wheel means provided for the vehicle contacting the ground, pump means forming fluid pressure generating means operably attached contiguously concomitant said wheel means and arranged to operate in synchronized relationship with said wheel means, said pump means provided with fluid pressure intake means communicating with a source of fluid pressure supply means carried by said vehicle, outlet conduit means provided for said pump means communicating with fluid pressure chamber means formed within the confines of casing means provided for movable switch member means disposed within the casing means and closing one side of the chamber means, fluid pressure emanating from said pump means active within said chamber means, effective against to move the switch member means, resilient means arranged to adjustably impinge and hold said switch member means in contiguous normally operative relationship with electrical circuit means provided to activate said motor means, whereby the ground speed of said wheel means, is synchronized with and controls the pressure built up by said pump means effective to move the switch member out of operative contact with the electrical circuit and deactivate said motor according to the adjusted tension of said resilient means against said movable switch member means.

4. A device of the character described including fluid pressure pump means operably attached concomitant drive shaft means attached contiguous from motor means provided for an automotive vehicle and interconnected with, for the rotation of drive wheel means provided for the vehicle and contacting the ground, wherein intake means provided for the pump means communicates with a fluid supply source provided for the vehicle, an outlet provided for said pump means communicating with chamber means for fluid pressure, provided with movable wall means forming pressure operated switch means arranged normally closing electric circuit means provided for activating said motor means, the switch means being exposed to fluid pressure created within said chamber means by said pump means, activated by the drive shaft means concomitant the drive wheel means of said vehicle, said movable member forming means for conducting electricity and normally closing said electric circuit, fluid pressure being built up by the pump means activated concomitant said drive wheel means, said movable switch member being normally held in closed position by adjustable means tensioned against resilient means provided concomitant said switch means, whereby the ground speed of the wheel means serves to deactivate said motor means according to the tensioned adjustment of the resilient means against the movable switch means.

References Cited

UNITED STATES PATENTS 1,824,292   9/1931   Murrow.

MILTON KAUFMAN, *Primary Examiner.*